United States Patent
Hellwig et al.

(10) Patent No.: US 8,031,561 B2
(45) Date of Patent: Oct. 4, 2011

(54) JOINT DESIGN OF THERMALLY-ASSISTED MAGNETIC RECORDING HEAD AND PATTERNED MEDIA FOR HIGH OPTICAL EFFICIENCY

(75) Inventors: Olav Hellwig, San Jose, CA (US); Barry C. Stipe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/607,933

(22) Filed: Oct. 28, 2009

(65) Prior Publication Data

US 2011/0096431 A1   Apr. 28, 2011

(51) Int. Cl.
*G11B 11/00* (2006.01)
(52) U.S. Cl. ..................................... 369/13.01
(58) Field of Classification Search .................. None
See application file for complete search history.

(56) References Cited

U.S. PATENT DOCUMENTS

| | | | | |
|---|---|---|---|---|
| 2008/0149809 A1* | 6/2008 | Hamann et al. | ............ | 250/201.1 |
| 2008/0151360 A1* | 6/2008 | Stipe | ............ | 359/350 |
| 2010/0091618 A1* | 4/2010 | Schabes et al. | ............ | 369/13.02 |
| 2010/0118431 A1* | 5/2010 | Tomikawa et al. | ............ | 360/59 |
| 2010/0142079 A1* | 6/2010 | Tanaka et al. | ............ | 360/59 |
| 2010/0208378 A1* | 8/2010 | Seigler et al. | ............ | 360/59 |
| 2010/0214684 A1* | 8/2010 | Gao et al. | ............ | 360/59 |
| 2010/0232050 A1* | 9/2010 | Schreck et al. | ............ | 360/59 |

OTHER PUBLICATIONS

Sendur et al., "Patterned medium for heat assisted magnetic recording" Applied Physics Letters 94. 032503 (2009).
Gage, Ed., "An Integrated Heat Assisted Magnetic Recording System" Seagate Technology, INSIC Light Delivery Workshop, Sep. 16, 2009.

* cited by examiner

*Primary Examiner* — Joseph Feild
*Assistant Examiner* — Henok Heyi
(74) *Attorney, Agent, or Firm* — Zilka-Kotab, PC

(57) ABSTRACT

A system according to one embodiment includes a magnetic recording medium having a magnetic layer with features in a discrete track configuration or a bit patterned configuration and an underlayer adjacent the magnetic layer, the underlayer comprising a material capable of forming surface plasmon resonance; and a magnetic head having: a writer for writing to the medium; and a near-field transducer for heating the medium for thermally assisted recording. Additional systems and methods are also presented.

20 Claims, 6 Drawing Sheets

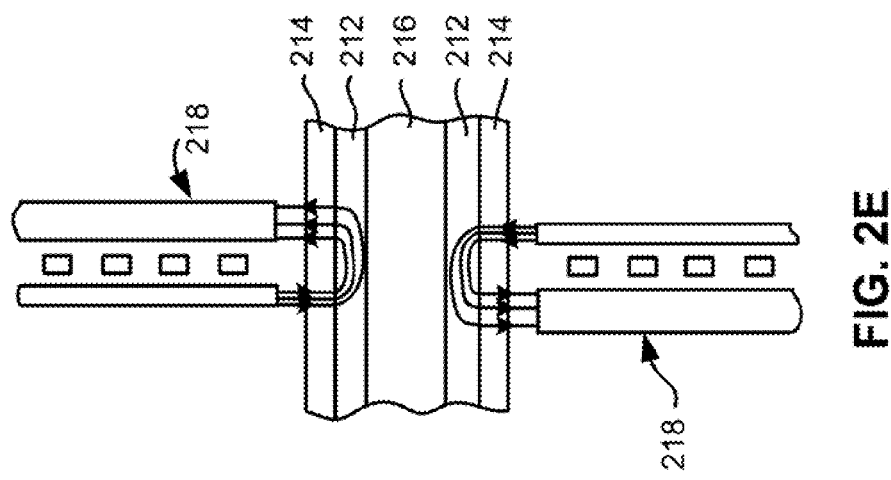
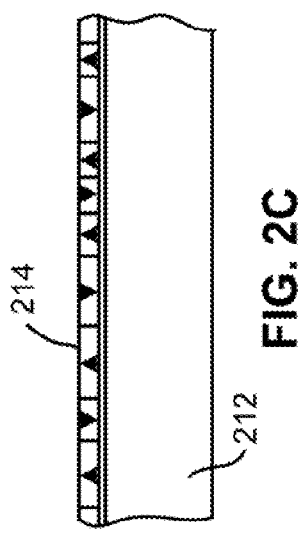
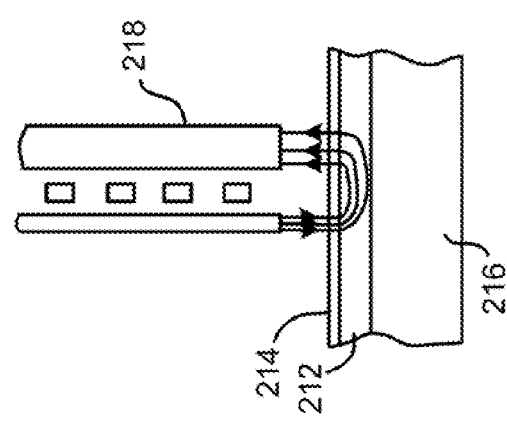
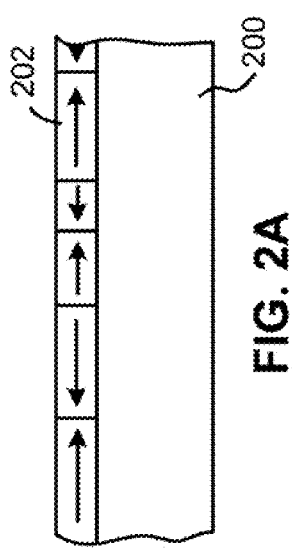
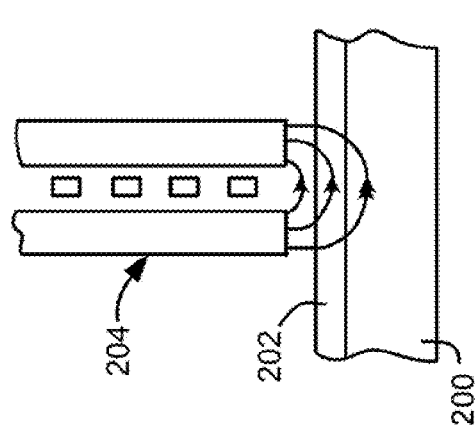

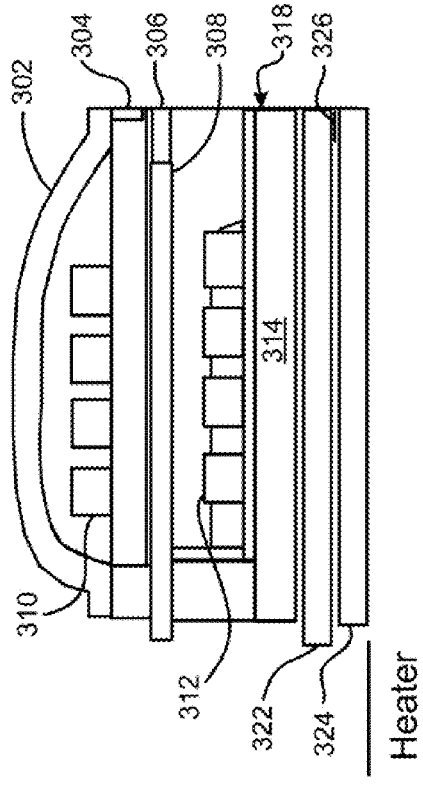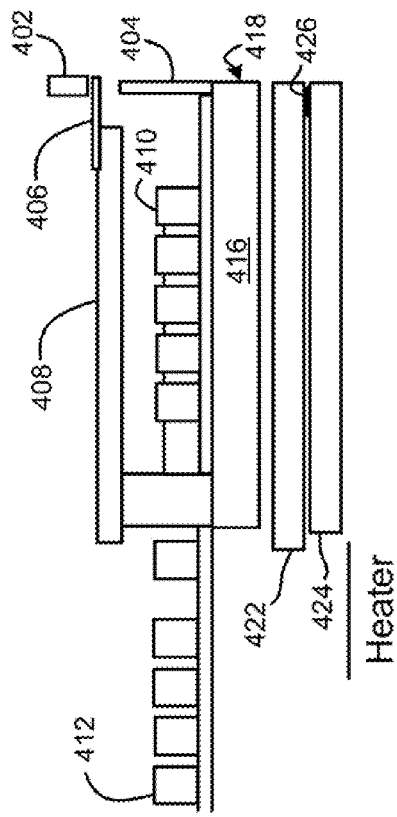
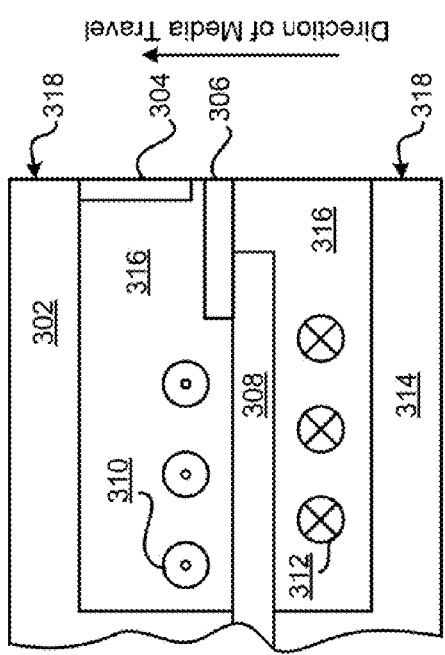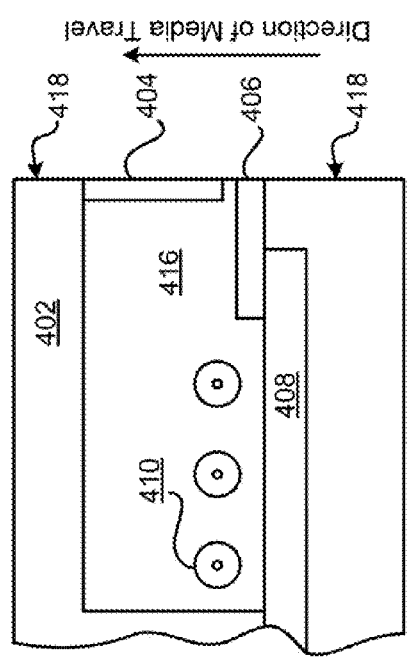

JOINT DESIGN OF THERMALLY-ASSISTED MAGNETIC RECORDING HEAD AND PATTERNED MEDIA FOR HIGH OPTICAL EFFICIENCY

FIELD OF THE INVENTION

The present invention relates to data storage systems, and more particularly, this invention relates to a near-field optical source (transducer) and a patterned magnetic disk for use in a thermally-assisted recording system.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The ongoing quest for higher storage bit densities in magnetic media used in disk drives have reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials, or techniques such as perpendicular recording (or both).

One additional solution has been proposed, which employs heat to lower the effective coercivity of a localized region on the magnetic media surface and writes data within this heated region. The data state becomes "fixed" upon cooling the media to ambient temperatures. This technique is broadly referred to as "thermally assisted (magnetic) recording", TAR or TAMR. It can be applied to both longitudinal or perpendicular recording systems, although the highest density state of the art storage systems are more likely to be perpendicular recording systems. Heating of the media surface has been accomplished by a number of techniques such as focused laser beams or near-field optical sources.

What is needed is a way to further improve TAR systems.

SUMMARY OF THE INVENTION

A system according to one embodiment includes a magnetic recording medium having a magnetic layer with features in a discrete track configuration or a bit patterned configuration and an underlayer adjacent the magnetic layer, the underlayer comprising a material capable of forming surface plasmon resonance; and a magnetic head having: a writer for writing to the medium; and a near-field transducer for heating the medium for thermally assisted recording.

A system according to another embodiment includes a magnetic recording medium having a magnetic layer with features in a discrete track configuration or a bit patterned configuration; and a magnetic head having: a writer for writing to the medium; and a near-field transducer for heating the medium for thermally assisted recording; and an optical waveguide for illuminating the near-field transducer. A bit width of the magnetic layer is defined as a width of one of the features between opposite sidewalls of the one of the features, the bit width being oriented in a cross-track direction relative to the data track, wherein the bit width is less than or equal to an effective width of a notch of the near-field transducer.

A magnetic storage medium according to one embodiment includes a magnetic recording medium having a magnetic layer with features in a discrete track configuration or a bit patterned configuration and an underlayer adjacent the magnetic layer, the underlayer comprising a material capable of forming surface plasmon resonance.

A method according to one embodiment includes causing a near-field transducer to heat a magnetic recording medium during writing of data thereto, the medium having a magnetic layer with features in a discrete track configuration or a bit patterned configuration, wherein a bit width of the magnetic layer is defined as a width of one of the features of the magnetic layer between opposite sidewalls of the one of the features, the bit width being oriented in a cross-track direction relative to the data track, wherein the bit width is less than or equal to an effective width of a notch of the near-field transducer.

A method according to another embodiment includes causing a near-field transducer to heat a magnetic recording medium during writing of data thereto, the medium having a magnetic layer with features in a discrete track configuration or a bit patterned configuration, wherein the medium further comprises an underlayer adjacent the magnetic layer, the underlayer comprising a material capable of forming surface plasmon resonance.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
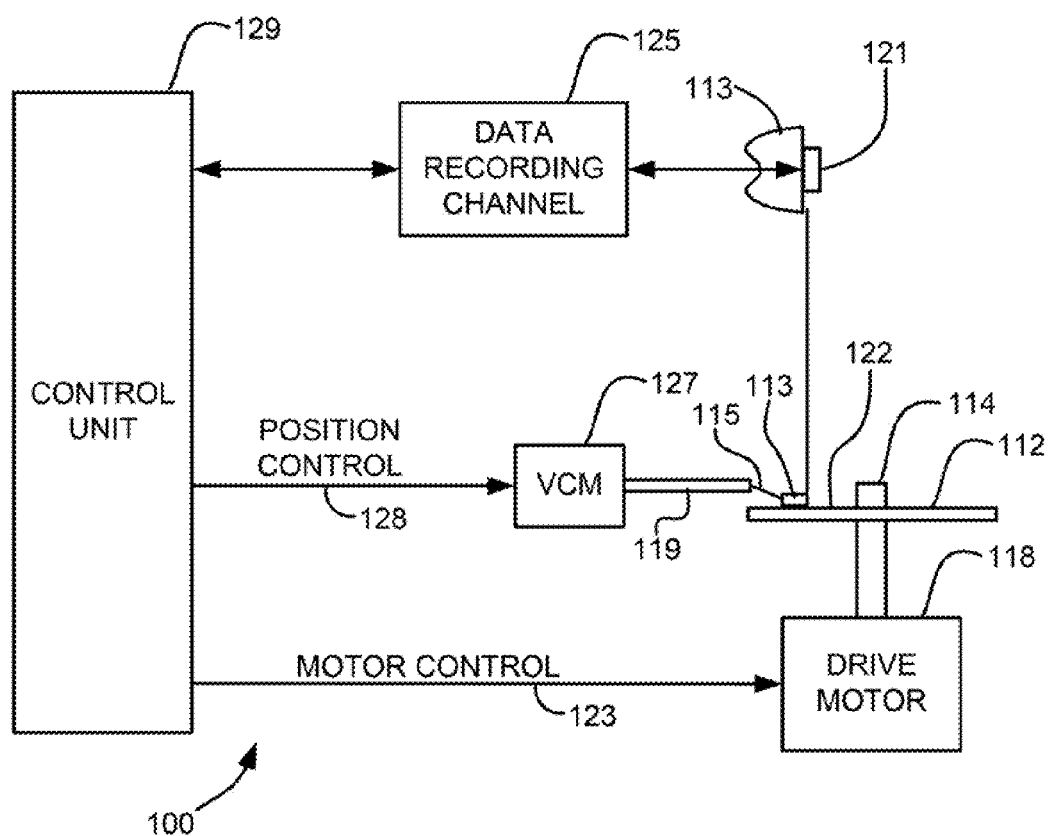
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a system includes a magnetic recording medium having a magnetic layer with features in a discrete track configuration or a bit patterned configuration and an underlayer adjacent the magnetic layer, the underlayer comprising a material capable of forming surface plasmon resonance; and a magnetic head having: a writer for writing to the medium; and a near-field transducer for heating the medium for thermally assisted recording.

In another general embodiment, a system includes a magnetic recording medium having a magnetic layer with features in a discrete track configuration or a bit patterned configuration; and a magnetic head having: a writer for writing to the medium; and a near-field transducer for heating the medium for thermally assisted recording; and an optical waveguide for illuminating the near-field transducer. A bit width of the magnetic layer is defined as a width of one of the features between opposite sidewalls of the one of the features, the bit width being oriented in a cross-track direction relative to the data track, wherein the bit width is less than or equal to an effective width of a notch of the near-field transducer.

In one general embodiment, a magnetic storage medium includes a magnetic recording medium having a magnetic layer with features in a discrete track configuration or a bit patterned configuration and an underlayer adjacent the magnetic layer, the underlayer comprising a material capable of forming surface plasmon resonance.

In one general embodiment, a method includes causing a near-field transducer to heat a magnetic recording medium during writing of data thereto, the medium having a magnetic layer with features in a discrete track configuration or a bit patterned configuration, wherein a bit width of the magnetic layer is defined as a width of one of the features of the magnetic layer between opposite sidewalls of the one of the features, the bit width being oriented in a cross-track direction relative to the data track, wherein the bit width is less than or equal to an effective width of a notch of the near-field transducer.

In another general embodiment, a method includes causing a near-field transducer to heat a magnetic recording medium during writing of data thereto, the medium having a magnetic layer with features in a discrete track configuration or a bit patterned configuration, wherein the medium further comprises an underlayer adjacent the magnetic layer, the underlayer comprising a material capable of forming surface plasmon resonance.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a helical coil 410, which wraps around to form helical coil 412. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

In Thermally-Assisted Recording (TAR), heat is used to assist the switching of high anisotropy media, according to one embodiment. By using high anisotropy media, very small grains can be used while maintaining thermal stability. For TAR to be realized properly, heat is confined to a single data track about 40 nm wide or smaller with high efficiency. Possible near-field optical sources typically use a low-loss metal (Au, Ag, Al, Cu, etc., and alloys thereof) shaped in such a way to concentrate surface charge motion at a tip apex located at the slider ABS when light is incident. Oscillating tip charge creates an intense near-field pattern, heating the disk. Sometimes, the metal structure can create resonant charge motion (surface plasmons) to further increase intensity and disk heating. For example, when polarized light is aligned with the notch of a transducer, such as an E-antenna, an intense near-field pattern is created at the end of the notch. Resonant charge motion can occur by adjusting the transducer dimensions to match a surface plasmon frequency to the incident light frequency. Unfortunately, charge motion in the near-field transducer metal also causes heating of the transducer itself, and this heating can reduce the long term reliability of the device. Also, if the efficiency of the transducer is low, a relatively powerful laser may be needed. It may be advantageous to improve near-field coupling between the tip/notch of the transducer and the disk to reduce head and slider heating and to use a lower power, less expensive laser.

In discrete-track media (DTM), grooves are created between data tracks in order to avoid the magnetically noisy and poorly written regions normally created at the track edges and to eliminate the magnetic exchange interactions between tracks. The grooves may be created, e.g., by forming the magnetic layer, masking the data tracks, and then removing the exposed regions of the magnetic layer, leaving tracks of writeable magnetic material. Other approaches to making the data tracks of DTM may also be used, as would be understood by one skilled in the art.

In bit-patterned media (BPM), physical islands, e.g., columns, of magnetic material are created to avoid the need for ultra fine-grained media. Rather, the island is comprised of exchange-coupled magnetic material that behaves as one thermally stable switching volume so that bit transitions are defined by the patterning. The islands may be created, e.g., by forming the magnetic layer, masking the islands, and then removing the exposed regions of the magnetic layer, leaving the islands of magnetic material. Other approaches to making the islands of BPM may also be used, as would be understood by one skilled in the art.

Both DTM and BPM can allow for higher areal density than conventional magnetic recording. According to one embodiment, TAR and DTM or TAR and BPM may be combined, in a way that significantly lowers the needed optical input power to the TAR near-field transducer.

Near-field optical modeling shows that optical efficiency can be significantly enhanced when the cross-track width of the near-field source is larger than the island diameter in bit-patterned media or land width in discrete-track media, where the land width may be defined between opposite sidewalls of the track in a direction perpendicular to the thickness of the track and perpendicular to the direction of track travel relative to a head reading or writing the track. Power efficiency can be also enhanced by using an un-patterned plasmonic layer (comprising Au, Cu, Ag, etc.) in the disk beneath the patterned magnetic media or by using a plasmonic underlayer that is patterned at the same time that the magnetic islands or tracks are patterned.

Figure 5A:
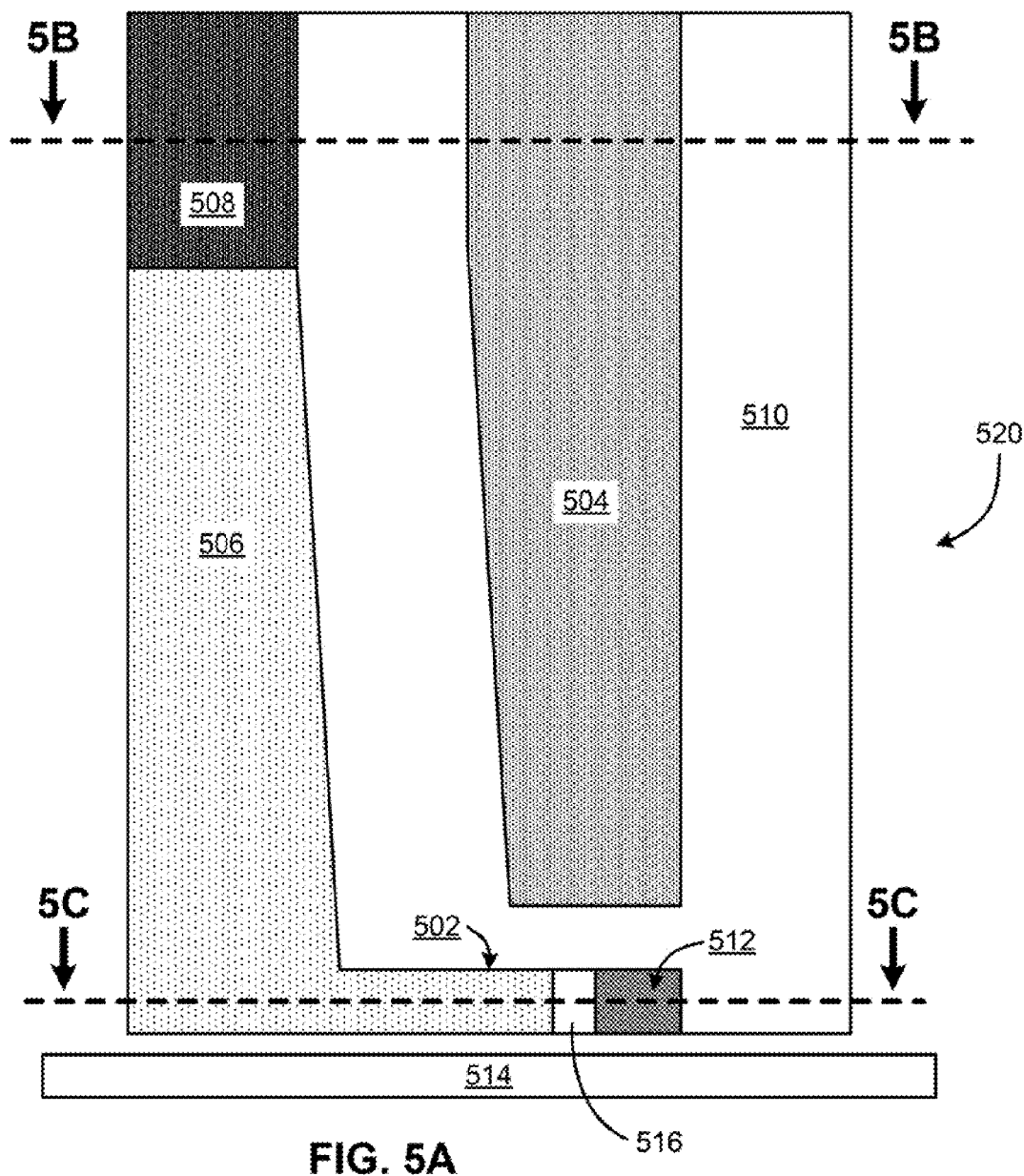
FIG. 5A is a schematic diagram of a side view of a portion of a magnetic head according to one embodiment.

FIG. 5A shows a side view of a portion of a magnetic head 520 with an integrated waveguide and near-field transducer 512 (in this case the E-antenna is shown), according to one embodiment. In this embodiment, the waveguide core 504 has a simple rectangular cross-section, however other waveguide structures, such as solid immersion mirrors, solid immersion lenses, etc., may also be used. The waveguide core 504 may be $Ta_2O_5$, $TiO_2$, or any other suitable dielectric material. The waveguide cladding 510 may be $Al_2O_3$, $SiO_2$, or some other suitable dielectric material.

As has been determined through modeling, the waveguide mode intensity profile is spread across a spot about 300 nm in radius. The disk absorption profile has also been determined through modeling, and shows that the near-field transducer focuses the input optical power from the waveguide to a very small spot at the surface of the disk while the magnetic field is supplied by an adjacent magnetic lip. In the example shown, approximately 10% of the power in the waveguide is dissipated in the disk within a 50 nm region using a 24 nm wide gold notch. Despite the high performance of the near-field transducer, the optical spot size is significantly larger than the notch width. Furthermore the lateral heat spreading at the surface of the disk results in an even larger thermal spot. While it is apparent that DTM and BPM can help reduce the lateral heat spreading to adjacent tracks (depending on the thermal properties of the material between the tracks), the near-field optical effects of the patterning are less well understood.

As has been shown through modeling, DTM and BPM can confine the power dissipation to a patterned region. In the event that the land or island width is smaller than the notch width, the power dissipation is generally confined to a spot even smaller than the notch width. According to the modeling with one particular head design, the average power density is 1.5 and 2.1 times larger than for the same volume in a flat disk for 24 nm wide DTM lands and 16 nm wide DTM lands, while adjacent tracks receive 9% and 25% of the center track power, respectively. In addition, the average power density is 3.0 and 4.3 times larger than for the same volume in a flat disk for 24 nm wide BPM islands and 16 nm wide BPM islands, while adjacent islands receive about 6% and about 21% of the center island power, respectively. Through modeling, it has been found that for a given track pitch, there is a trade-off between land/island width and readback signal, and between transducer tip/notch width and adjacent track erasure. To improve optical efficiency, the tip/notch cross-track width is preferably larger than the land/island cross-track width.

Because of the very small dimensions involved (small compared to the wavelength of the light), the effect of patterning on optical efficiency can be approximately described by simple electrostatics. As shown in FIGS. 6A-6D, patterning of the disk focuses electric field lines 610 toward the lands/islands (especially toward the edges), according to some embodiments. This focusing of the field lines 610 is a result of the solutions to Laplace's equation; for example, the field lines 610 are perpendicular to the surface of a smooth conducting surface and the charge density near a sharp 90° edge varies as the distance from the edge "d" as $d^{-1/3}$.

The electric field amplitudes can be further enhanced by employing an underlayer 608 of Au, Cu, Ag, etc. Metals such as these are known for the ability to form surface plasmon resonances which are typically exploited by the near-field transducer to enhance the charge density in the tip/notch 602. When used as an underlayer 608, they can form an image of the transducers surface plasmon to increase the charge flow into the lands and/or islands of patterned media 514. By increasing the charge flow, additional heating occurs and the efficiency of the system increases. In addition, the base of the lands and/or islands can include a layer of Au, Cu, Ag, etc., which may be patterned at the same time that the magnetic recording layer 604 is patterned. By using a low loss metal patterned below the land and/or island, charge can be further concentrated in the same way that the transducer tip concentrates the transducer surface plasmon charge flow. In some cases, these patterned noble metal features can produce surface plasmons depending on the dimensions of the pattern and wavelength of the light.

Now referring to FIG. 5A, a simplified schematic diagram of a system is shown according to one embodiment. The system includes a magnetic recording medium 514 having a magnetic layer with features in a discrete track configuration or a bit patterned configuration. The discrete track configuration or a bit patterned configuration is not shown in the figure for sake of clarity. The system also includes a magnetic head 520, the magnetic head 520 having a writer (magnetic pole) 506 for writing to the magnetic medium 514 and a near-field transducer 512 for heating the medium 514 for thermally assisted recording.

Now referring to FIGS. 6A-6D, according to some approaches, a bit width α of the magnetic layer 604 may be defined as a width of one of the features between opposite sidewalls of the feature (e.g., one land if the magnetic recording medium 514 has features in a discrete track configuration or one island if the magnetic recording medium 514 has features in a bit patterned configuration) thereof and associated with one data track, the bit width α being oriented in a cross-track direction relative to the data track, wherein the bit width α is less than or equal to an effective width of a notch (or tip) of the near-field transducer 512. By "effective width," what is meant is that since different transducers may have different physical profiles, it is difficult to physically describe a single dimension for transducers of different physical profiles, such as triangular profiles, circular profiles, etc. Therefore, the "effective width" is determined as the full width half maximum of the optical absorption profile one would get using the transducer on a flat magnetic recording medium. For example, an E-antenna with a 24 nm notch has an "effective width" of approximately 30 nm. The magnetic recording medium 514 may have features in a discrete track configuration or a bit patterned configuration, and the gap(s) 606 between the bits may include voids and/or may include any nonmagnetic material, including dielectric material, electrically insulating material, etc. and combinations thereof. Examples of nonmagnetic materials that may be used in the gap(s) 606 include metal oxides such as aluminum oxide; polymers; resists; lubricants; etc. and combinations thereof. As implied, the thickness of the nonmagnetic material in the gap(s) may be as thick as the features as in FIGS. 6B and 6C, not as thick as the features (e.g., gap is partially filled), or thicker than the features as in FIG. 6D and/or such that the nonmagnetic material is taller than the features.

Figure 6A:
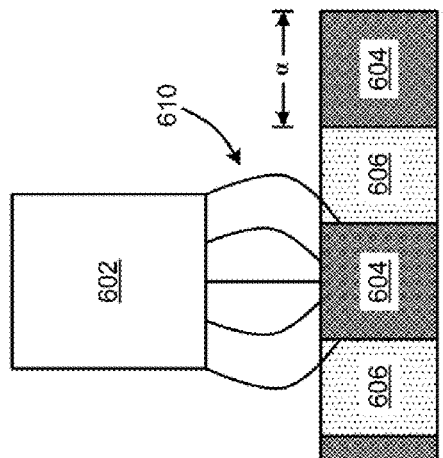
FIGS. 6A-6D are schematic diagrams of electrical field lines emanating from a write pole tip to a magnetic recording medium, according to several embodiments.
Figure 6B:
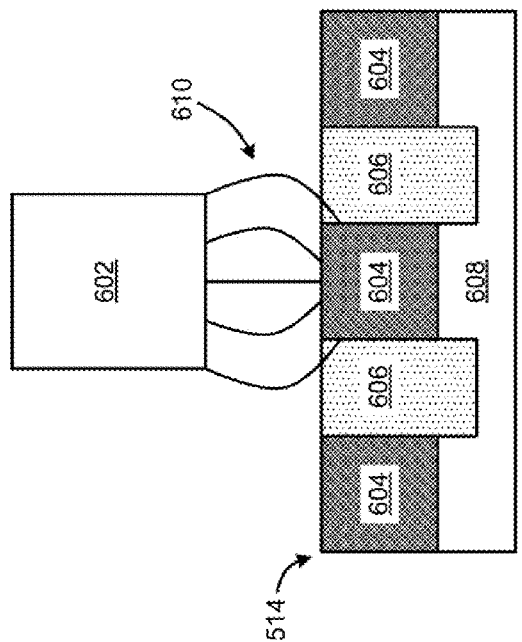

In some more approaches, a bit width α of the magnetic layer 604 may be defined as a width of one of the features (e.g., plateau or island) thereof and associated with one data track, the bit width α being oriented in a cross-track direction relative to the data track, wherein the bit width α is less than or equal to a full width half maximum of the optical absorption profile one would obtain when using the same magnetic head 520 under identical operating conditions with a second magnetic recording medium having a magnetic layer with a contiguous upper side, e.g., as used in conventional media and without a physically patterned magnetic layer (such as the one shown in FIG. 6A).

Figure 6C:
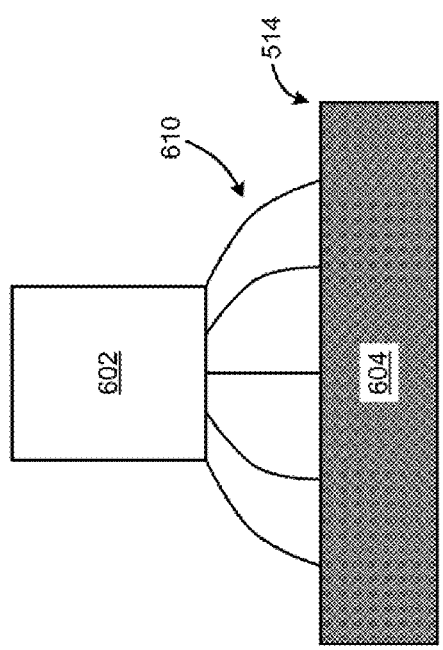
Figure 6D:
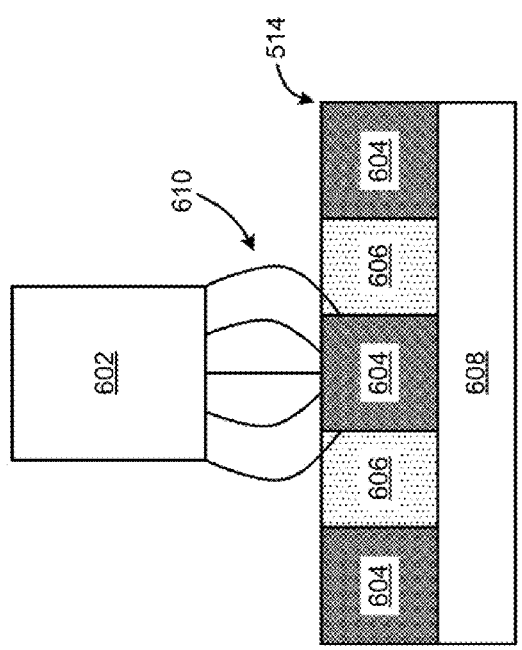

Referring to FIGS. 6C-6D, in some embodiments, the magnetic medium 514 may further comprise an underlayer 608 adjacent the magnetic layer 604. The underlayer 608 may comprise a material capable of forming surface plasmon resonance, such as Au, Cu, Ag, etc., and alloys thereof. In further embodiments, the features of the magnetic layer 604 may be raised above portions of the underlayer 608. In one approach, the underlayer 608 may have a planar upper surface as in FIG. 6C. In another approach, a portion of the exposed regions of the underlayer 608 may be removed when the magnetic medium 514 is patterned to form the features, resulting in the underlayer 608 having raised portions under the features of the magnetic layer as in FIG. 6D. In additional embodiments, the underlayer 608 may be only under the features of the magnetic layer 604. For example, all of the exposed regions of the underlayer 608 may be removed when the magnetic medium 514 is patterned to form the features.

In some preferred embodiments, the near-field transducer 512 may include an E-antenna. Of course, other near-field transducer configurations are also possible, such as a C-aperture, an antenna having a rounded profile, an antenna having a triangular profile, etc.

Referring again to FIG. 5A, according to some approaches, the system may include an optical waveguide (504 & 510) for illuminating the near-field transducer 512. The waveguide core 504 may be a recessed dielectric waveguide and may be integrated with the near-field transducer 512 for achieving TAR. The waveguide core 504 may be optimally recessed by a distance from the transducer 512 and this space may be filled with low index dielectric material leading to significant enhancement of the optical efficiency. In one preferred embodiment, the low index dielectric material in the recessed space may be deposited after fabrication of the near-field transducer 512 using an anisotropic deposition followed by deposition of the high index core material. The optical waveguide core 504 may be comprised of any suitable material as is known to one of skill in the art, such as $Ta_2O_5$, $TiO_2$, etc. The waveguide cladding 510 may be comprised of any suitable material as is known to one of skill in the art, such as $Al_2O_3$, $SiO_2$, etc. Also, a dielectric layer 516 may be positioned in the gap between the magnetic lip 502 and the near-field transducer 512. The dielectric layer 516 may be comprised of any suitable material as is known to one of skill in the art, such as $Al_2O_3$, $SiO_2$, $Ta_2O_5$, etc.

Figure 5C:
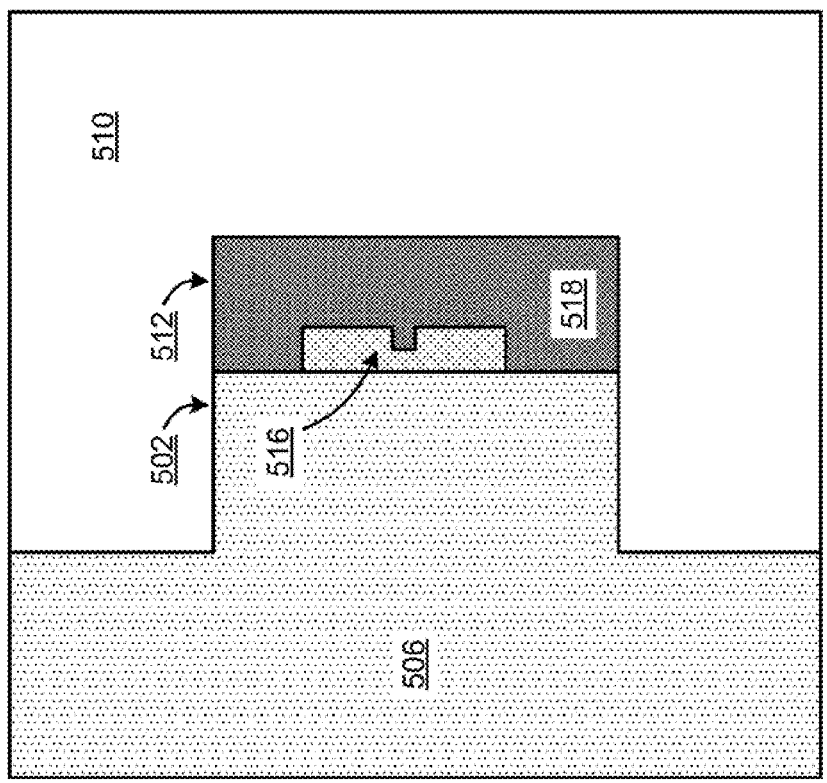
FIG. 5C is a cross-sectional view taken from line 5C in FIG. 5A.
Figure 5B:
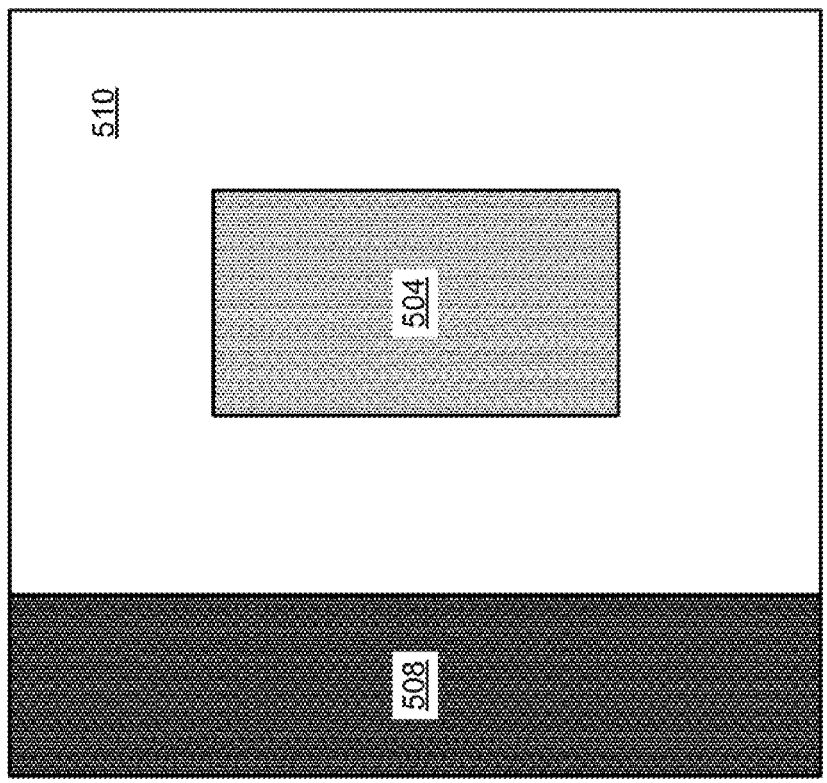
FIG. 5B is a cross-sectional view taken from line 5B in FIG. 5A.

Now referring to FIG. 5B, a cross-sectional schematic taken from line 5B in FIG. 5A, the upper portion of the optical waveguide (504 & 510) is described. As shown, the waveguide cladding 510 surrounds the waveguide core 504, thereby isolating the core from surrounding layers and focusing the optical energy presented to the waveguide. As shown at this position away from the magnetic medium 514, the structure may be generally referred to as an optical waveguide. The waveguide core 504 may have a rectangular cross-section as shown, or any other cross-sectional profile as selected by one of ordinary skill in the relevant art, such as square, triangular, circular, elliptical, etc. Other waveguide structures may also be used, such as solid immersion mirrors, solid immersion lenses, etc. Another cladding layer 508 is shown as well, and may be comprised of any suitable material, as is known by one of ordinary skill in the art.

With reference to FIG. 5C, the portion of the magnetic head 520 closer to the magnetic medium 514 is described. As shown, the writer (main pole) 506 may form a magnetic lip 502 that extends toward the near-field transducer 512. A dielectric layer 516 may be surrounded on three sides by a conductive metal film 518, such as Au, Ag, Cu, etc. The notch in the dielectric layer 516 may also be filled with the conductive metal film 518. The three sides of the metal film 518 which are not in contact with the dielectric layer 516 may be adjacent to the cladding layer 510.

In some preferred embodiments, an insulating layer (not shown) distinct from the waveguide cladding 510 may electrically isolate the near-field transducer 512 from the lip 502. In addition, a portion of this insulating layer between the main pole 506 and the near-field transducer 512 may preferably have a thickness of between 0 nm and about 80 nm, for example about 8 nm.

Typically, a near-field transducer 512 optical source includes a rectangular shaped dielectric layer 516 placed in an electrically conductive metal film 518. In some embodiments, the near-field transducer 512 may include an E-antenna (as shown). Light of the appropriate frequency is directed onto the antenna and the surrounding dielectric films.

Now referring to FIGS. 5A-5C, according to one embodiment, light is directed to the near-field transducer 512 which comprises the dielectric layer 516 and surrounding metal film 518, via optical waveguide core layer 504. Extending into the center portion of the dielectric layer 516 is an electrically conductive ridge, generally (but not necessarily) an extension of the surrounding metal film 518. Incident radiation, polarized in the direction parallel to the ridge produces a near-field light source which appears close to or at the end of the ridge, in the gap between the end of the ridge and the opposing boundary of the dielectric layer 516. In the present embodiment, magnetic lip 502 is located at this opposing boundary, placing the near-field light source in close proximity to the magnetic lip 502.

Modeling studies have uncovered the unexpected development that a magnetic lip 502 of approximately the same height as antenna material 518, can be in close proximity to the antenna with minimal impact on the optical efficiency, provided that the magnetic lip 502 borders dielectric layer 516, and is located across from the end of the ridge. This locates the effective pole tip of the write head at very close proximity to the thermal region generated by a near-field light source, which is located between the end of the ridge and the edge of magnetic lip 502.

In each of FIGS. 5A-5C, the left most portion of the figure may extend further and may form more shapes and may include additional layers. Also, other layers and combinations of layers may be used in the system as would be used by one of ordinary skill in the relevant art, including insulating layers, adhesive layers, etc. In addition, any of the layers described in relation to the system may be comprised of multiple layers, which may or may not be of the same material.

Other types or designs of near-field transducers may be used in various embodiments. For example, the antenna portion of the near-field transducer may have a generally triangular shape. In another example, the antenna portion may have a generally round body with a notch extending from a periphery thereof, the notch being instrumental in inducing the heating of the medium.

In another embodiment, a method comprises causing a near-field transducer to heat a magnetic recording medium during writing of data thereto. The magnetic recording medium includes a magnetic layer with features in a discrete track configuration or a bit patterned configuration, such as those shown in FIGS. 5A-6D.

According to one embodiment of the method, a bit width of the magnetic layer may be defined as a width of one of the features between opposite sidewalls of the feature (e.g., one land if the magnetic recording medium has features in a discrete track configuration or one island if the magnetic recording medium has features in a bit patterned configuration) thereof and associated with one data track, the bit width being oriented in a cross-track direction relative to the data track. The bit width is less than or equal to an effective width of a notch (or tip) of the near-field transducer. By "effective width," what is meant is that since different transducers may have different physical profiles, it is difficult to physically describe a single dimension for transducers of different physical profiles, such as triangular profiles, circular profiles, etc. Therefore, the "effective width" is determined as the full width half maximum of the optical absorption profile you would get using the transducer on a flat magnetic recording medium.

In another embodiment, a bit width of the magnetic layer may be defined as a width of one of the features (e.g., plateau or island) thereof and associated with one data track, the bit width being oriented in a cross-track direction relative to the data track. The bit width may be less than or equal to a full width half max of the optical absorption profile one would obtain when using the same magnetic head under identical operating conditions with a second magnetic recording medium having a magnetic layer with a contiguous upper side, e.g., as used in conventional media and without the physically patterned magnetic layer.

In more approaches, the magnetic recording medium may further comprise an underlayer adjacent the magnetic layer (such as that shown in FIGS. 6C-6D), the underlayer comprising a material capable of forming surface plasmon resonance, such as Au, Cu, Ag, etc. and alloys thereof.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a magnetic recording medium having a magnetic layer with features in a discrete track configuration or a bit patterned configuration and an underlayer adjacent the magnetic layer, the underlayer comprising a material capable of forming surface plasmon resonance; and
   a magnetic head having:
      a writer for writing to the medium; and
      a near-field transducer for heating the medium for thermally assisted recording, wherein the near-field transducer includes at least one of an E-antenna and an antenna having a rounded profile.

2. The system as recited in claim 1, wherein a bit width of the magnetic layer is defined as a width of one of the features thereof between opposite sidewalls of the one of the features, the bit width being oriented in a cross-track direction relative to the data track, wherein the bit width is less than or equal to an effective width of a notch of the near-field transducer.

3. The system as recited in claim 1, wherein a bit width of the magnetic layer is defined as a width of one of the features thereof between opposite sidewalls of the one of the features, the bit width being oriented in a cross-track direction relative to the data track, wherein the bit width is less than or equal to a full width half max of the optical absorption profile one would obtain when using the same magnetic head under identical operating conditions with a second magnetic recording medium having a magnetic layer with a contiguous upper side.

4. The system as recited in claim 1, wherein the features of the magnetic layer are above raised portions of the underlayer, the underlayer being a contiguous film extending under several data tracks.

5. The system as recited in claim 1, wherein the underlayer is only under the features of the magnetic layer.

6. The system as recited in claim 1, wherein the near-field transducer includes the E-antenna.

7. The system as recited in claim 1, wherein the near-field transducer includes the antenna having a rounded profile.

8. The system as recited in claim 1, wherein the near-field transducer includes an antenna having a triangular profile.

9. A system, comprising:
a magnetic recording medium having a magnetic layer with features in a discrete track configuration or a bit patterned configuration; and
a magnetic head having:
a writer for writing to the medium; and
a near-field transducer for heating the medium for thermally assisted recording; and
an optical waveguide for illuminating the near-field transducer,
wherein a bit width of the magnetic layer is defined as a width of one of the features between opposite sidewalls of the one of the features, the bit width being oriented in a cross-track direction relative to the data track, wherein the bit width is less than or equal to an effective width of a notch of the near-field transducer.

10. The system as recited in claim 9, wherein the bit width is also less than or equal to a full width half max of the optical absorption profile one would obtain when using the same magnetic head under identical operating conditions with a second magnetic recording medium having a magnetic layer with a contiguous upper side.

11. The system as recited in claim 9, wherein the medium further comprises an underlayer adjacent the magnetic layer, the underlayer comprising a material capable of forming surface plasmon resonance.

12. The system as recited in claim 11, wherein the features of the magnetic layer are above raised portions of the underlayer, the underlayer being a contiguous film extending under several data tracks.

13. The system as recited in claim 11, wherein the underlayer is only under the features of the magnetic layer.

14. The system as recited in claim 9, wherein the near-field transducer includes an E-antenna.

15. The system as recited in claim 9, wherein the near-field transducer includes an antenna having a rounded profile.

16. The system as recited in claim 9, wherein the near-field transducer includes an antenna having a triangular profile.

17. A method, comprising causing a near-field transducer to heat a magnetic recording medium during writing of data thereto, the medium having a magnetic layer with features in a discrete track configuration or a bit patterned configuration, wherein a bit width of the magnetic layer is defined as a width of one of the features of the magnetic layer between opposite sidewalls of the one of the features, the bit width being oriented in a cross-track direction relative to the data track, wherein the bit width is less than or equal to an effective width of a notch of the near-field transducer.

18. The method as recited in claim 17, wherein the bit width is less than or equal to a full width half max of the optical absorption profile one would obtain when using the same magnetic head under identical operating conditions with a second magnetic recording medium having a magnetic layer with a contiguous upper side.

19. The method as recited in claim 17, wherein the medium further comprises an underlayer adjacent the magnetic layer, the underlayer comprising a material capable of forming surface plasmon resonance.

20. A method, comprising causing a near-field transducer to heat a magnetic recording medium during writing of data thereto, wherein the near-field transducer includes at least one of an E-antenna and an antenna having a rounded profile, and the medium having a magnetic layer with features in a discrete track configuration or a bit patterned configuration, wherein the medium further comprises an underlayer adjacent the magnetic layer, the underlayer comprising a material capable of forming surface plasmon resonance.

* * * * *